United States Patent [19]

Borst

[11] B 4,002,068

[45] Jan. 11, 1977

[54] LEVEL-SENSITIVE SYSTEM

[75] Inventor: John A. Borst, San Jose, Calif.

[73] Assignee: Owens-Corning Fiberglas Corporation, Toledo, Ohio

[22] Filed: Apr. 24, 1974

[21] Appl. No.: 463,473

[44] Published under the second Trial Voluntary Protest Program on March 23, 1976 as document No. B 463,473.

[52] U.S. Cl. ............................................. 73/302
[51] Int. Cl.² ...................................... G01F 23/16
[58] Field of Search ............. 73/299, 302; 137/237

[56] References Cited
UNITED STATES PATENTS

| | | | |
|---|---|---|---|
| 1,442,400 | 1/1923 | Green | 73/299 |
| 2,553,918 | 5/1951 | Hofer | 73/302 X |
| 2,956,581 | 10/1960 | Pearson | 73/299 X |
| 3,048,037 | 8/1962 | Melchior | 73/299 |
| 3,422,682 | 1/1969 | Evans et al. | 73/299 X |
| 3,613,456 | 10/1971 | Hopfe et al. | 73/302 X |
| 3,751,185 | 8/1973 | Gottliebson et al. | 73/299 X |

*Primary Examiner*—Richard C. Queisser
*Assistant Examiner*—John S. Appleman
*Attorney, Agent, or Firm*—John W. Overman; Allen D. Gutchess

[57] ABSTRACT

A level-sensitive system responsive to the level of liquid in a container is provided. A level-sensitive device, e.g. a gauge or pressure switch, is connected by a line to a lower portion of the container. Gas, specifically air, is supplied to the line under pressure sufficient to enable the gas to pass slowly into the container and to bubble upwardly, thereby keeping the liquid out of the line and away from the level-sensitive device. The flow of the gas is sufficiently slow that it does not affect the operation of the level-sensitive device. A liquid such as water also can be supplied to the line under pressure to flow into the container. The quantity of the water is also maintained small enough so as not to affect the operation of the level-sensitive device. The water is effective to prevent growth of fungus or the like in the liquid of the container which otherwise can form adjacent the line leading into the container and block the line after a period of time. An upwardly-extending loop is formed in the line between the container and the level-sensitive device and specifically between the device and the water supply. This loop has its upper extremity above the maximum liquid level to be reached in the container and thus prevents the container liquid from reaching the level-sensitive device in the event of air or water failure. The device can also be removed for repair or replacement without the possibility that the liquid in the container will leak out.

1 Claim, 1 Drawing Figure

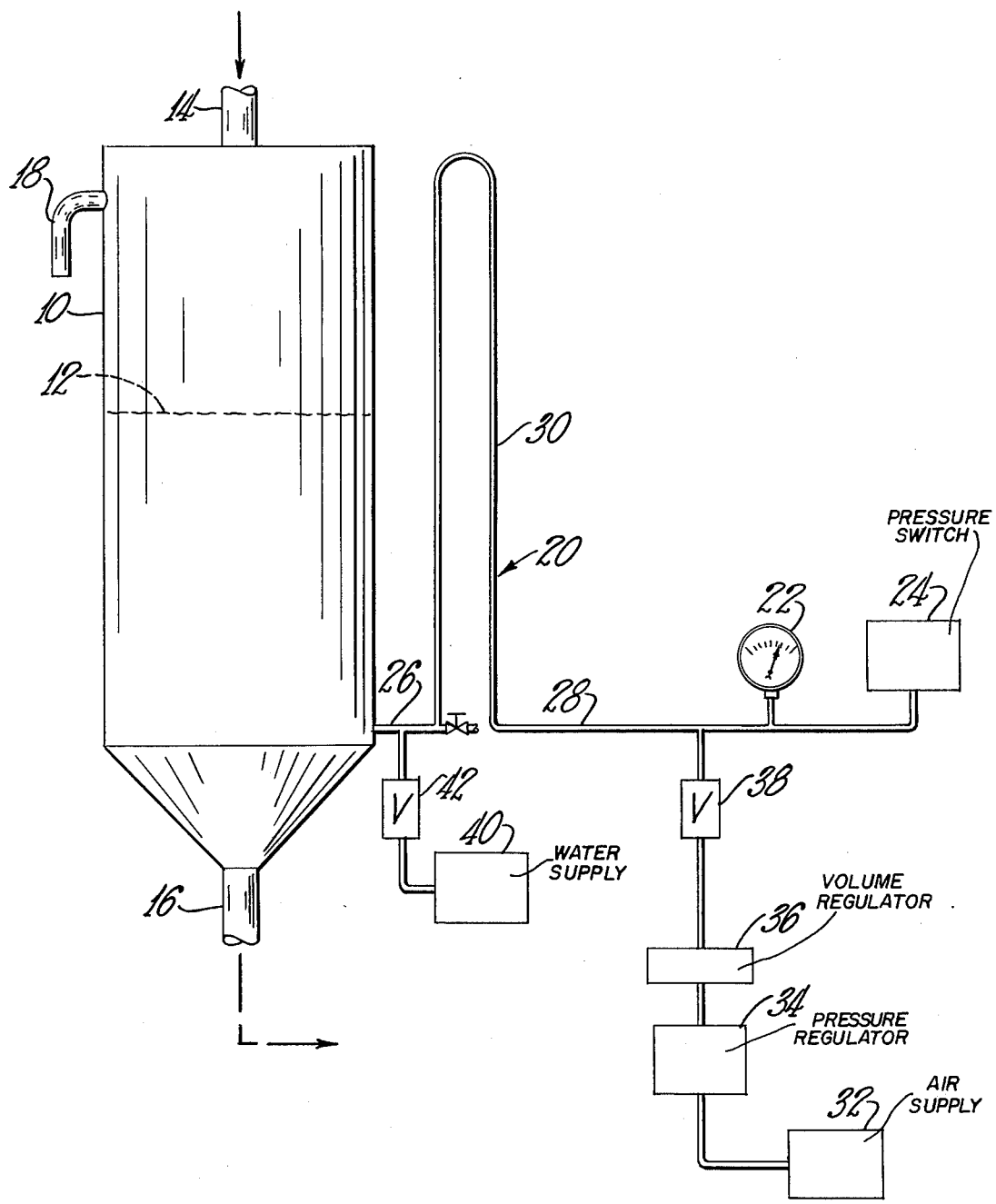

LEVEL-SENSITIVE SYSTEM

This invention relates to a level-sensitive system for a container of liquid, the level of which is subject to variation.

The system according to the invention is particularly suitable for a binder tank. Typically, the binder is applied to glass fibers in a forming operation with the excess binder returned to the tank or container, at which time make-up water can be added, if needed. The binder is then pumped back to the fiber-forming operation and perhaps to other operations, too. A line provides a passage between a lower portion of the tank and a level-sensitive device which can be in the form of a gauge or a pressure switch, or both, by way of example. In accordance with the invention, gas, such as air, is supplied to the line between the tank and the level-sensitive device under a pressure sufficient to cause the gas to enter the tank slowly and bubble upwardly therein. This keeps the liquid out of the line and away from the device, which could become quickly inoperable if subjected to the sticky binder. Also in accordance with the invention, a liquid such as water can be supplied to the line under a pressure sufficient to cause it to enter the tank slowly. The water is important when the liquid in the tank is a binder which is of a nature such that it causes growth in the tank adjacent the line, which growth apparently is of a fungus nature caused by an interaction of the binder and air. Further in accordance with the invention, the line is formed with an upwardly extending loop between the tank and the sensitive device with the upper extremity of the loop being above the highest level of the liquid to be reached in the tank. With the loop, in the event of air or water failure, the binder still cannot reach the device. It is also possible to remove the level-sensitive device for repair or replacement without the binder leaking out of the tank.

It is, therefore, a principal object of the invention to provide an improved level-sensitive system for containers of liquid.

Another object of the invention is to provide a supply of gas under pressure to a line connecting a container of liquid with a level-sensitive device to keep the liquid out of the line and to prevent the liquid in the container from reaching the device.

A further object of the invention is to provide a supply of liquid and a supply of gas to a line connected between a container of liquid and a level-sensitive device to prevent the liquid in the container from reaching the device and to prevent a growth adjacent the inlet of the line into the container.

Yet another object of the invention is to provide a level-sensitive system having a line connected between a container and a level-sensitive device with the line having an upwardly-extending loop, the upper extremity of which is above the highest liquid level reached in the container.

Many other objects and advantages of the invention will be apparent from the following detailed description of a preferred embodiment thereof, reference being made to the accompanying drawing, in which:

The single FIGURE of the drawing diagramatically shows a level-sensitive system embodying the invention.

Referring to the drawing, a container or tank 10 contains liquid 12, the level of which is subject to variation. By way of a specific example, the liquid 12 is a binder received from an inlet line 14. This line can be connected with a fiber-forming operation in which the binder is sprayed on glass fibers as they are formed, with the excess binder being collected and pumped to the tank 10 through the line 14. Make-up water can be supplied to the binder 12, if required, and the binder can then be pumped through an outlet line 16 back to the same or other fiber-forming operations. The tank has a suitable vent 18.

A line indicated at 20 connects a lower portion of the container 10 with level-sensitive devices such as a gauge 22 and a pressure switch 24. The gauge 22 is responsive to the pressure of the liquid in the container 10 and provides a visual indication of the level therein. The pressure switch 24 is sensitive to the level of the liquid in the container and can control that level by various means. For example, the pressure switch 24 can be connected to a pump in the outlet line 16. When the liquid 12 in the container drops to a predetermined level, the switch 24 can turn off to stop the operation of the pump. When the liquid 12 rises to a predetermined level, the switch 24 can turn on again to operate the pump.

The line 20 which provides communication between level-sensitive devices and the container 10 includes two horizontal portions 26 and 28 connected by an upwardly extending loop 30. The upper extremity of the loop 30 is above the maximum level of the liquid 12 which can be reached in the container 10 so that the liquid and particularly a sticky binder cannot reach the devices 22 and 24. Further, the devices can be removed for replacement or repair, by way of example, without the binder leaking from the container 10.

In accordance with the invention, a gas, preferably air, is supplied to the line 20 under a pressure exceeding the pressure of the liquid 12 so that the air flows through the line 20 into the container 10 and prevents the liquid from entering the line. For this purpose, a suitable air supply indicated at 32 is provided. This air is reduced to a predetermined pressure by a regulator 34 and the volume of the air is then controlled by a constant flow differential device 36, with the flow rate of the air indicated on an airflow scope 38, all of these devices or instruments being commercially available. By way of example, the air is regulated by the regulator 34 to a pressure of 9 psig and is controlled to a volume of one standard cubic foot per hour by the device 36, as indicated by the scope 38. The air, being under a pressure exceeding the head of the liquid 12 in the tank 10, flows slowly through the line portion 28, the loop 30, and the line portion 26 and bubbles up in the liquid. The volume of air used will depend primarily on the diameter of the line portion 26. With a one-half inch pipe, a flow of one-half to one standard cubic foot per hour of air has been found to be suitable, with the air pressure ranging from nine to fifteen psig. With smaller pipes, less air can be employed and with larger pipes, more air must be employed to keep liquid out of the line. The maximum amount of air used is that which will not affect the reading of the gauge 22 and the operation of the pressure switch 24. This can be readily determined simply by adjusting the flow device 36 while watching the gauge 22.

The loop 30 and the line portion 28 can be considerably smaller than the line portion 26. If the line portion 26 is one-half inch pipe, the loop 30 and the line portion 28 can be one-quarter inch copper tubing, by way of example.

It has been found that with some liquids, such as certain binders exhibiting a degree of alkalinity (e.g. a pH of 8), constituting the liquid 12 in the tank 10, a growth occurs at the entrance of the line portion 26 into the tank 10 and will block this line in as short a time as a day. The exact cause of the growth is not known nor is it important. However, it is believed that either oxygen or carbon dioxide in the air reacts with the binder and causes this growth in the form of algae, fungus, or slime. In accordance with the invention, it has been found that the growth can be eliminated simply by supplying liquid such as plain water through the line 20 and specifically supplying it through the line portion 26. The water either stops the growth or prevents it from accumulating adjacent the inlet of the line. For this purpose, a supply of water indicated at 40 is provided which is under a pressure exceeding the head of the liquid 12 in the tank 10. The flow of the water is controlled by a water flow scope 42 to supply the water to the line portion 26 at a selected rate, as little as one cubic centimeter per minute. The scope 42 is a commercially available device which both regulates the water flow and indicates the quantity. When the liquid 12 in the tank 10 is to receive make-up water anyway, the quantity of water supplied through the line portion 26 can be considerably more. With a half-inch pipe for the line portion 26, the flow can be up to two gallons per hour without affecting the reading of the gauge 22 or the operation of the pressure switch 24. In a preferred range, the flow of water is 10cc per minute to one gallon per hour.

Various modifications of the above described embodiment of the invention will be apparent to those skilled in the art, and it is to be understood that such modifications can be made without departing from the scope of the invention if they are within the spirit and tenor of the accompanying claims.

I claim:

1. In combination, a container for a liquid, the level of which is subject to rising and falling, a device sensitive to the level of the liquid in the container, passage means connecting the device to a lower portion of said container, means for supplying gas under pressure to said passage means to effect a flow of gas into said container through said passage means, and means for supplying liquid under pressure through said passage means to said container, at a rate of 10 cc per minute to 2 gallons per hour, to effect a combined flow of liquid and gas into said container and through said passage means downstream of the liquid introduction site.

* * * * *